2,820,023
Patented Jan. 14, 1958

2,820,023
ESTER INTERCHANGE REACTION USING A LANTHANUM CATALYST

Robert Morris Cavanaugh, Wilmington, Del., and Jane Bowen Dempster, Sunbury, Pa., assignors to E. I. du Pont de Nemours and Company, Wilmington, Del., a corporation of Delaware No Drawing. Application November 15, 1954
Serial No. 468,992

10 Claims. (Cl. 260—75)

This invention relates to an improved method for the manufacture of monomeric and polymeric esters of polycarboxylic acids and more particularly to such a method which employs a novel catalyst in the reaction mixture.

This application is a continuation-in-part of our corresponding application Serial No. 323,148, filed November 28, 1952, for a Chemical Process, which in turn was a continuation-in-part of application Serial No. 115,942, filed September 15, 1949, for a Chemical Process, both now abandoned.

The preparation of esters of polycarboxylic acids by the reaction of glycols with polycarboxylic acids or their alkyl esters has assumed practical importance. An example may be taken from the preparation of ethylene glycol terephthalate by the alcoholysis reaction of ethylene glycol with dimethyl terephthalate. The ethylene glycol terephthalate may be subsequently polymerized to form a material possessing properties that adapt it for use as an industrial fiber. In effecting the foregoing alcoholysis and polymerization procedures, catalysts have been sought to accelerate the reactions and increase the conversions. While considerable improvement has been achieved with previously disclosed catalysts such as lead monoxide, undesirable color development has almost invariably occurred. The devising of a catalytic process for the above purpose that would give efficient conversions and that would at the same time yield a product substantially free from color would constitute an important advance.

An object of the present invention is a novel and improved process for the manufacture of esters of polycarboxylic acids by the reaction of a glycol with a lower alkyl ester of a polycarboxylic acid whereby satisfactory speed of reaction is attained and a product results that is free from color to a high degree. A further object is such a process wherein a novel catalytic material is employed to accomplish the improvement. A still further object is an effective catalytic process for the manufacture of the reaction product of ethylene glycol and terephthalic acid or its dimethyl ester. Additional objects will be disclosed as the invention is described in detail in the following.

We have found that the foregoing objects are accomplished when we react a glycol of the general formula, $HO-(CH_2)_n-OH$, in which $n$ is a number not less than 2 and not greater than 10, with at least one compound from the group consisting of polycarboxylic acids and their lower alkyl esters, and carry out the reaction in the presence of a lanthanum-containing material as catalyst. While various glycols may be employed, as well as a considerable number of polycarboxylic acids, we find the manufacture of ethylene glycol terephthalate from ethylene glycol and dimethyl terephthalate a particularly advantageous place of application, because of the importance of the product and the excellent results obtained. A number of forms of lanthanum may be used; particularly it will be employed as the oxide, in metallic form, or as a compound of lanthanum containing a radical of a weak acid or a radical of a volatile acid. While lanthanum is particularly effective as a catalyst in the preparation of monomeric ethylene glycol terephthalate, it is likewise useful in the polymerization of the monomeric material. Lanthanum may be used as the sole catalyst effectively with preparation of material free from color to a high degree, as compared for example with similar material in the preparation of which lead oxide has functioned as catalyst. Advantageously also it may be used in combination with a second catalyst, such as antimony or germanium oxides or metals.

In carrying out the process, the effect of various catalysts was determined by the following procedure, application being made here to the preparation of monomeric and polymeric ethylene glycol terephthalate. The desired amounts of dimethyl terephthalate and ethylene glycol were introduced into a small distillation flask, and the catalyst was added. The flask was heated for a period of time and the methanol distilled over was collected, the amount formed being taken as an indication of the percentage completion of the alcoholysis reaction. Generally speaking, with a reasonably active catalyst this part of the reaction was completed in a period of 1 to several hours as judged by collection of the calculated amount of methanol or by the overhead temperature. In the preparation of the monomer, the vapors distilling over were not allowed to exceed 70–75° C.; and the pot temperature during the distillation varied in the range of 160–225° C. depending on the catalyst and on the progress of the distillation. Generally, this stage of the reaction will be carried out in the temperature range 150–230° C. The monomer was then introduced directly in measured amount into a polymerization tube of 25 mm. outside diameter.

The tube was provided with a side arm for distillation purposes, and a capillary extended nearly to the bottom of the tube, through which pure dry nitrogen gas was introduced. A flask was connected to the side arm to collect the distillate, this flask being provided with a vacuum pump connection. The tube was then heated and the excess glycol distilled over. With full vacuum in the system, the contents were heated at a specified temperature (for purposes of this test either 265 or 275° C. as delineated in the examples below) for several hours. Generally, this stage of the reaction will be carried out in the temperature range 230–290° C. The equipment was disassembled, and the polymerization tube was removed for comparison of the color with known color standards.

Following the foregoing procedure, the catalysts of the present invention were shown to give superior results with respect to both rate of reaction and quality, the latter being determined by the color of the polymer produced. The polymer obtained when litharge (PbO) was used as catalyst was the standard of comparison, since this material had been the preferred catalyst previously. In designating color, numerical values are employed, 1 designating the color present in a tube containing a known quantity of a dye, 2 representing twice the amount of color in 1, etc. The same considerable excess of ethylene glycol was used in all preparations, for example 3 or 4 parts to 1 by weight, though such ratios are not to be taken as limiting.

When the final stage of the process described above was carried out at 265° C. the following results were obtained:

| Percent La₂O₃ | 2nd catalyst | Wt. Percent | Color | PbO control color |
|---|---|---|---|---|
| .01 | | | 1 | 4 |
| .01 | | | 2 | 4 |
| .01 | Sb₂O₃ | .01 | 1 | 4 |
| .01 | CeO₂ | .005 | 1 | 5 |
| .01 | Si | .005 | 1 | 5 |
| .01 | GeO₂ | .005 | 0 | 5 |
| .01 | GeO₂ | .005 | 1 | 5 |
| .01 | Ca(OH)₂ | .01 | 0.5 | 4 |

In another set of experiments the temperature in the final stage of the reaction was kept at 275° C. Additionally, this second stage or polymerization phase of the reaction was discontinued after four hours to permit a comparison of the rapidity of this phase of the reaction as determined by the relative viscosity of the final polymer. This parameter, "relative viscosity," is a measure of the degree of polymerization. For the purposes of this invention, the relative viscosity was determined by measuring in a capillary viscometer the viscosity of a solution of eleven g. of the polymer dissolved in 100 cc. of the mixed solvent composed of seven parts by weight of trichlorophenol and ten parts by weight of phenol, and then relating the viscosity of this polymer solution to the viscosity of the named mixed solvent, i. e., $$\text{Relative viscosity} = \frac{\text{efflux time for the solution}}{\text{efflux time for the solvent}}$$

In these experiments it will be noted that in some instances antimony oxide was added as an auxiliary catalyst after the first stage or alcoholysis reaction had been completed and before the second stage or the polymerization reaction was begun.

It will be noted from column 2 that the lanthanum compounds have been compared on an equal molar basis, i. e., where the lanthanum catalyst calculated as the element was equal to 0.036 mol percent of the dimethyl terephthalate (DMT). The control run using lead oxide was carried out on a 0.009 mol percent basis since this was a commercially established procedure. Higher amounts of lead oxide, although giving a modest increase in rate of reaction, are definitely unsuitable because of a marked increase in the color factor.

The foregoing tabulations show that the use of lanthanum containing materials is decidedly advantageous from the view point of color of the material after polymerization. It is definitely advantageous also with respect to acceleration of the alcoholysis or ester exchange reaction. Not only is lanthanum oxide alone a superior catalyst particularly in the first stage of the reaction but, in combination with a second catalyst, even better results are frequently obtained. The use of antimony and germanium compounds as such second catalyst is particularly effective. It will sometimes be desirable to add the second catalyst after the alcoholysis reaction (the so-called first stage of the reaction) has been completed.

As shown in the table, lanthanum salts containing a radical of a weak acid and lanthanum salts containing a radical of a volatile acid are effective catalysts according to the present invention. The strength of an acid is conveniently measured by the equilibrium constant, K, for the dissociation of the acid in aqueous solution. In the present invention, it has been found that lanthanum salts of acids for which the value of K is less than $10^{-2}$ are effective catalysts. Examples of such effective catalysts shown in the table include the lanthanum salts of phthalic acid ($K=1.26\times10^{-3}$), formic acid ($K=1.76\times10^{-4}$), acetic acid ($K=1.75\times10^{-5}$), and benzoic acid $$(K=6.3\times10^{-5})$$

Moreover, lanthanum salts of volatile acids are likewise effective catalysts; i. e., salts of acids having a boiling point at atmospheric pressure no higher than about 100° C. Examples of these catalysts shown in the table include lanthanum salts of hydrochloric acid (B. P. −83.7°), trifluoroacetic acid (B. P. 72.4°), and nitric acid (B. P. 86°).

It is believed that radicals of strong acids have a general tendency to retard the catalytic effect of the lanthanum; salts of volatile strong acids are nevertheless effective, apparently because the free volatile acid is formed and swept out of the reaction mixture with the evolved methanol, although this statement is not intended to be limiting. However, it is known that lanthanum salts of nonvolatile strong acids have only a low degree of catalytic activity. Examples shown in the table include the lanthanum salts of oxalic acid ($K=6.5\times10^{-2}$), sulfuric acid, and benzenesulfonic acid. Values for the dissociation constants given here were taken from the Handbook of Chemistry and Physics, thirty-fifth edition (1953), Chemical Rubber Publishing Company, Cleveland, Ohio, page 1637.

While the lanthanum catalyst of this invention is very desirable in the preparation of ethylene glycol terephthalate from ethylene glycol and terephthalic acid or its lower alkyl esters, it is effective also in ester exchange reactions involving other glycols and other polycarboxylic acids or their alkyl esters. This is illustrated by the following tabulation wherein the experiments were carried out with a polymerization temperature of 265° C.

| Lanthanum catalysts | Wt. percent of lanthanum catalyst based on DMT | Hours required to complete the first stage or alcoholysis reaction | Wt. percent Sb₂O₃ based on DMT added as auxiliary catalyst | Second stage of polymerization reaction 4 hrs., 275° C., 0.5 mm. Hg abs. | |
|---|---|---|---|---|---|
| | | | | Product color | Relative viscosity of final polymer |
| Lanthanum formate | 0.05 | 1.1 | 0.03 | 1 | 34 |
| Lanthanum acetate | 0.06 | 1.3 | | 1.5 | 13 |
| Lanthanum trifluoroacetate | 0.10 | 1.3 | 0.03 | 2 | 37 |
| Lanthanum nitrate | 0.075 | 1.4 | | 3 | 13 |
| Lanthanum phthalate | 0.073 | 1.4 | 0.03 | 1.5 | 36 |
| Lanthanum chloride | 0.063 | 1.7 | | 1 | 14 |
| Do | 0.063 | 1.4 | 0.03 | 3 | 32 |
| Lanthanum oxide | 0.03 | 1.5 | | 1 | 14 |
| Lanthanum benzoate | 0.10 | 1.5 | 0.03 | 2 | 41 |
| Lead oxide (PbO) | 0.01 | 2.7 | | 2.5 | 17 |
| Lanthanum benzene sulfonate | 0.11 | 15% complete in 2 hrs | | | |
| Lanthanum sulfate | 0.052 | 10% complete in 2 hrs | | | |
| Lanthanum oxalate | 0.059 | 5% complete in 2 hrs. (lanthanum oxalate insoluble) | | | |

| Reactants | | Catalyst | Percent | Color |
|---|---|---|---|---|
| Glycol | Ester | | | |
| Ethylene glycol | Dimethyl sebacate | La₂O₃ | .01 | 1. |
| Do | Dimethyl terephthalate+dimethyl sebacate (50-30) | PbO | .01 | Dark gray. |
| | | La₂O₃ | .01 | 0.5. |
| Diethylene glycol | Dimethyl terephthalate | PbO | .01 | 6. |
| Ethylene glycol+pentaglycol (90-10) | do | La₂O₃ | .01 | 4. |
| | | PbO | .01 | 6. |
| | | La₂O₃ | .01 | 4. |
| | | PbO | .01 | 4. |
| Ethylene glycol | Isophthalic acid | La₂O₃ | .01 | 5. |
| | | PbO | .01 | 4. |
| Do | Terephthalic acid | La₂O₃ | .01 | 4. |
| | | PbO | .01 | 2. |
| | | | .01 | 2. |

Lanthanum in the foregoing tabulation is shown to be an effective catalyst in promoting ester exchange reactions involving various glycols and polycarboxylic acids. While lanthanum has been used in the form of its oxide in the examples cited in this tabulation, it may be present also in metallic form or as a compound of lanthanum containing a radical of a weak acid or a radical of a volatile acid. The presence of a second catalyst along with the lanthanum compound has been found desirable in many cases, and materials containing antimony, germanium, cerium, calcium, silicon, cobalt, manganese, zinc, magnesium, etc. have proved desirable cooperating catalysts. The amount of catalyst is not a limiting factor, but generally it is found desirable to employ an amount of catalyst (calculated as the element) greater than 0.001 mole percent of the polycarboxylic acid or its ester. An amount of catalyst in excess of 0.07 mole percent will be generally unnecessary and undesirable. To obtain the full activity of any given catalyst, it should be appreciably soluble in the reaction medium either initially of during the course of the reaction.

The glycol entering into this reaction will be of the general formula, HO—(CH$_2$)$_n$—OH, where $n$ is a number not less than 2 and not greater than 10. Ethylene glycol is the preferred diol for use because of its availability and the desirable products obtained. Other glycols may be employed, however, such as diethylene glycol, 2,2-dimethyl-1,3-propanediol sometimes designated pentaglycol, and the like.

While polycarboxylic acids have been stated to be used in the reactions, the dicarboxylic acids are the preferred compounds, with terephthalic acids as the preferred one. Ordinarily the alkyl esters of such acids will be the most desirable form for use, for example, dimethyl terephthalate. We find as acceptable materials also, isophthalic acid, sebacic acid, adipic acid, azelaic acid, and many others, especially in the form of their lower dialkyl esters. Where the term lower alkyl esters is used, we intend this to include only esters of alcohols containing not more than four carbon atoms. In addition to dimethyl terephthalate, therefore, such esters as diethyl and dibutyl terephthalates are within the scope of this invention.

It has been found that advantageous properties are obtained not only in the glycol esters formed by the reaction of single glycols and dicarboxylic acids but by coreactions of more than one glycol or of more than one acid in the form of their esters. Blends of glycols, therefore, are desirable such as ethylene glycol with diethylene glycol, pentaglycol and the like. Acid blends are likewise frequently suitable, such as mixtures of terephthalic with isophthalic, sebacic, azelaic, suberic, and adipic acids, etc. It will be understood that glycol esters formed from all the foregoing reactions are usually not applicable practically in their monomeric forms but that the polymers are the final products desired. The catalysts of the present invention function in the formation of both monomers and polymers as accelerants of the reaction and as materials that allow the obtaining of a substantially color-free product.

The invention has been described adequately in the foregoing. It will be understood, however, that many variations may be introduced in details of procedures, quantities and specific formulas of reactants, without departure from the scope of the invention. We wish to be limited, therefore, only by the following claims.

We claim:

1. A process for the manufacture of esters of dicarboxylic acids, which comprises reacting at a temperature from 150° C. to about 290° C. a glycol of the general formula HO—(CH$_2$)$_n$—OH, in which $n$ is a number not less than 2 and not greater than 10, with a compound from the group consisting of the dicarboxylic acids in which each carboxyl group has been esterified by an alcohol containing not more than four carbon atoms, said reaction being carried out in the presence of a catalyst taken from the class consisting of metallic lanthanum, lanthanum oxide, lanthanum salts of an acid having an equilibrium constant of less than 10⁻², and lanthanum salts of an acid having a boiling point at atmospheric pressure below about 100° C.

2. The process of claim 1, in which the reaction is carried out at a temperature of from 150° C. to about 230° C. so that a monomeric ester is prepared.

3. The process of claim 1, in which the reaction is carried out at a temperature of from 230° C. to about 290° C. so that a polymeric ester is prepared.

4. A process for the manufacture of an ester of terephthalic acid, which comprises reacting at a temperature from 150° C. to about 290° C. ethylene glycol and dimethyl terephthalate in the presence of a catalyst taken from the class consisting of metallic lanthanum, lanthanum oxide, lanthanum salts of an acid having an equilibrium constant of less than 10⁻², and lanthanum salts of an acid having a boiling point at atmospheric pressure below about 100° C.

5. The process of claim 4, in which the catalyst comprises a catalytic material taken from the class consisting of metallic lanthanum, lanthanum oxide, lanthanum salts of an acid having an equilibrium constant of less than 10⁻², and lanthanum salts of an acid having a boiling point at atmospheric pressure below about 100° C., and a catalytic material taken from the class of materials containing antimony, germanium, cerium, calcium, silicon, cobalt, manganese, zinc and magnesium.

6. The process of claim 1 in which the catalyst comprises lanthanum.

7. The process of claim 1 in which the catalyst comprises lanthanum oxide.

8. The process of claim 1 in which the catalyst comprises lanthanum formate.

9. The process of claim 1 in which the catalyst comprises lanthanum acetate.

10. The process of claim 1 in which the catalyst comprises lanthanum trifluoroacetate.

References Cited in the file of this patent

UNITED STATES PATENTS 2,465,319    Whinfield et al.    Mar. 22, 1949
2,534,028    Izard    Dec. 12, 1950
2,643,989    Auspos et al.    June 30, 1953

OTHER REFERENCES

Lel' Chuk: Chem. Abs., 42, 6630-1 (1948).